US008868575B2

(12) United States Patent
Amit et al.

(10) Patent No.: US 8,868,575 B2
(45) Date of Patent: Oct. 21, 2014

(54) METHOD AND SYSTEM FOR TRANSFORMATION OF LOGICAL DATA OBJECTS FOR STORAGE

(75) Inventors: Jonathan Amit, Omer (IL); Ori Shalev, Kiryat Ono (IL)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 13/006,370

(22) Filed: Jan. 13, 2011

(65) Prior Publication Data

US 2011/0202546 A1    Aug. 18, 2011

Related U.S. Application Data

(60) Provisional application No. 61/294,655, filed on Jan. 13, 2010.

(51) Int. Cl.
*G06F 17/30* (2006.01)
*H04L 29/08* (2006.01)
*G06F 3/06* (2006.01)
*H04L 29/06* (2006.01)

(52) U.S. Cl.
CPC .......... *H04L 67/1097* (2013.01); *H04L 67/108* (2013.01); *G06F 3/0623* (2013.01); *G06F 3/0608* (2013.01); *G06F 3/0641* (2013.01); *G06F 3/067* (2013.01); *H04L 63/20* (2013.01)
USPC .......................................... 707/755; 711/112

(58) Field of Classification Search
CPC ............................................... G06F 2212/401
USPC ........................................................ 711/112
See application file for complete search history.

(56) References Cited

U.S. PATENT DOCUMENTS

| 4,598,411 | A | * | 7/1986 | Berkovich et al. | 375/246 |
| 5,319,793 | A | * | 6/1994 | Hancock et al. | 345/602 |
| 5,612,742 | A | * | 3/1997 | Krause et al. | 375/240.25 |
| 5,734,892 | A | * | 3/1998 | Chu | 1/1 |
| 5,862,140 | A | * | 1/1999 | Shen et al. | 370/468 |

(Continued)

FOREIGN PATENT DOCUMENTS

| WO | 2007/138600 A2 | 12/2007 |
| WO | 2007/138601 A2 | 12/2007 |
| WO | 2007138602 A2 | 12/2007 |

OTHER PUBLICATIONS

Shen et al, A Spatial-Temporal Parallel Approach for Real-Time MPEG Video Compression, IEEE, 1996, II-100 to II-107.*

*Primary Examiner* — April Y Blair
*Assistant Examiner* — Kenneth Tsang
(74) *Attorney, Agent, or Firm* — Griffiths & Seaton PLLC

(57) ABSTRACT

Various embodiments for transforming a logical data object for storage in a storage device operable with at least one storage protocol are provided. In one such embodiment, the logical data object into one or more segments are divided with each segment characterized by respective start and end offsets. One or more obtained variable size data chunks are processed corresponding to the logical data object to obtain processed data chunks, wherein at least one of the processed data chunks comprises transformed data resulting from the processing. Each of the variable size data chunks is associated with a respective segment of the logical data object. The processed data chunks are sequentially accommodated in accordance with an order of chunks received while keeping the association with the respective segments.

30 Claims, 8 Drawing Sheets

(56) References Cited

U.S. PATENT DOCUMENTS

| | | | |
|---|---|---|---|
| 6,035,349 A | 3/2000 | Ha et al. | |
| 6,480,664 B1* | 11/2002 | Ting et al. | 386/343 |
| 6,507,672 B1* | 1/2003 | Watkins et al. | 382/232 |
| 6,842,832 B1* | 1/2005 | Franaszek et al. | 711/159 |
| 7,966,495 B2* | 6/2011 | Ackerman et al. | 713/180 |
| 2002/0108017 A1* | 8/2002 | Kenchammana-Hoskote et al. | 711/113 |
| 2004/0148316 A1* | 7/2004 | Bridge et al. | 707/104.1 |
| 2006/0004808 A1* | 1/2006 | Hsu et al. | 707/101 |
| 2006/0253645 A1* | 11/2006 | Lasser | 711/103 |
| 2007/0208893 A1* | 9/2007 | Azzarello et al. | 710/68 |
| 2008/0082769 A1* | 4/2008 | Bouchou et al. | 711/161 |
| 2008/0313364 A1* | 12/2008 | Flynn et al. | 710/31 |

* cited by examiner

METHOD AND SYSTEM FOR TRANSFORMATION OF LOGICAL DATA OBJECTS FOR STORAGE

CROSS-REFERENCE TO RELATED APPLICATION

This non-provisional application claims the benefit under 35 U.S.C. §119(e) of U.S. Provisional Application No. 61/294,655, filed Jan. 13, 2010, which is incorporated herein by reference.

FIELD OF THE INVENTION

This invention relates to computing systems, and, in particular, to methods and systems capable of transforming logical data objects to be stored in computing systems and networks thereof.

BACKGROUND OF THE INVENTION

With increasing demand for faster, more powerful and more efficient ways to store information, optimization of storage technologies becomes one of the key challenges. The logical data objects (data files, image files, data blocks, etc.) may be transformed for transmission and/or storage. The transformation may comprise compression, encryption, encoding, conversion, etc. and/or combinations thereof. For example, data compression techniques are used to reduce the amount of data to be stored or transmitted in order to reduce the storage capacity and transmission time respectively. Compression may be achieved by using different compression algorithms known in the art. Data stored in plaintext is open to potential malicious use (e.g. unauthorized access, misuse, theft, etc.), and known in the art solutions for perimeter and/or access control (e.g. firewalls, Virtual Private Networks, LUN masking control and zoning in SAN storage networks, NAS security control features, etc.) still leave security vulnerabilities. Encrypting data to be stored may considerably reduce security threats; such encryption may be provided by using different algorithms known in the art.

SUMMARY OF THE INVENTION

Various challenges and problems of compressing, encrypting or other transforming data for storage and access to the stored transformed data have been recognized in the Prior Art. Accordingly, various systems have been developed to provide a solution, for example, International Applications WO2007138600, WO2007138601 and WO2007138602 published Dec. 12, 2007. The entire contents of PCT applications are hereby incorporated by reference in its entirety.

In accordance with certain aspects of the present invention, various embodiments for transforming a logical data object for storage in a storage device operable with at least one storage protocol are provided. In one such embodiment, by way of example only, the logical data object is divided into one or more segments, with each segment characterized by respective start and end offsets. One or more obtained variable size data chunks are processed corresponding to the logical data object to obtain processed data chunks. At least one of the processed data chunks comprises transformed data resulting from the processing. Each of the variable size data chunks is associated with a respective segment of the logical data object. The processed data chunks are sequentially accommodated in accordance with an order of chunks received while keeping the association with the respective segments.

In addition to the foregoing exemplary embodiment, other system and computer program product embodiments are disclosed and provide related advantages.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "activating" or the like, refer to the action and/or processes of a computer that manipulate and/or transform data into other data, said data represented as physical, such as electronic, quantities. The term "computer" should be expansively construed to cover any kind of electronic device with data processing capabilities, including, by way of non-limiting example, personal computers, servers, computing system, communication devices, storage devices, processors (e.g. digital signal processor (DSP), microcontrollers, field programmable gate array (FPGA), application specific integrated circuit (ASIC), etc.) and other electronic computing devices.

The operations in accordance with the teachings herein may be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The term "logical data object (LO)" used in this patent specification should be expansively construed to include any types and granularities of data units used in a computing system and handled as one unit (e.g. data files, archive files, image files, database files, memory data blocks, stream data blocks, predefined segments of files, etc.).

Figure 1:
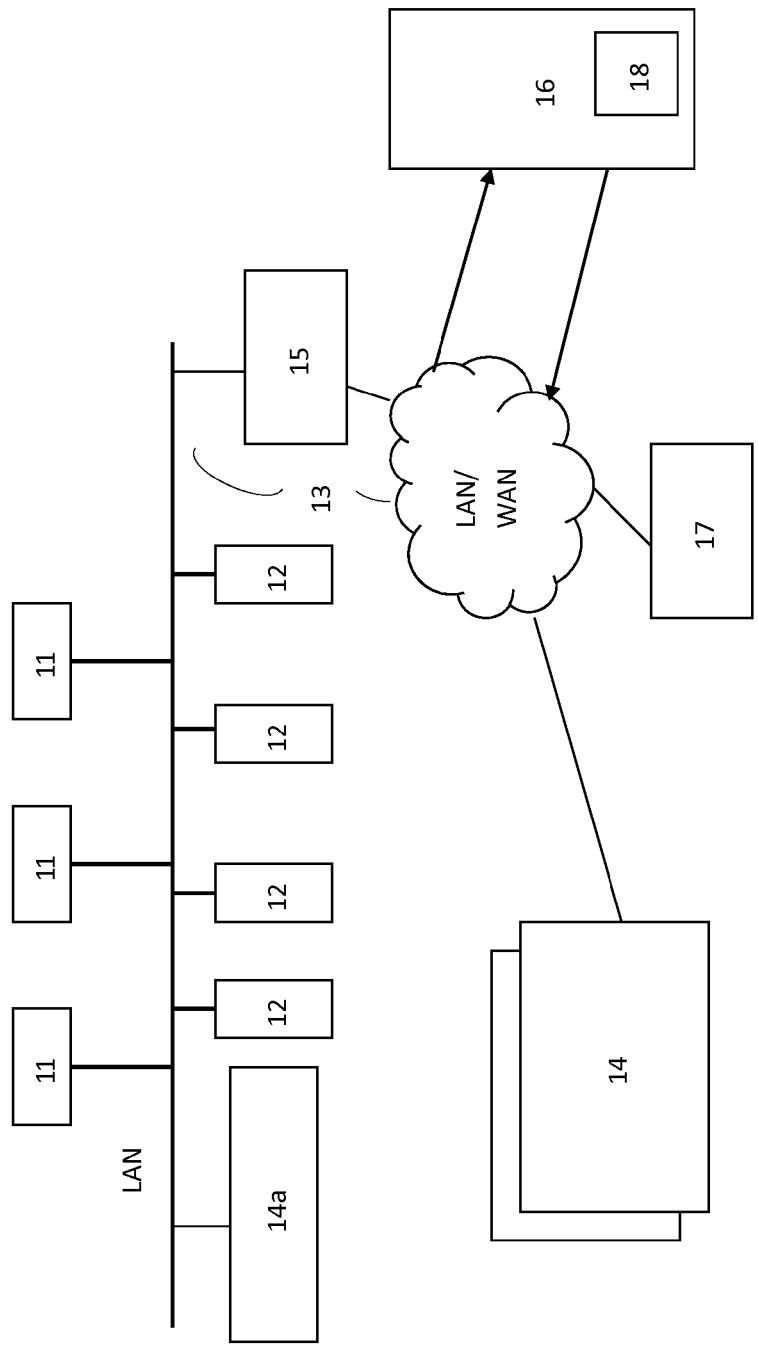
FIG. 1 illustrates a schematic block diagram of typical storage network architecture as is known in the art.

Bearing this in mind, attention is drawn to FIG. 1 illustrating a schematic diagram of typical storage network architectures as known in the art. The logical data objects (LO) from clients 11 and/or servers 12 are transferred via network 13 to storage device(s) 14 (e.g. specialized NAS file servers, general purpose file servers, SAN storage, stream storage device, etc.) and/or 14a. The network comprises one or more communication devices 15 (e.g. switch, router, bridge, etc.) facilitating the data transfer. The storage in the illustrated network may be wholly or partly implemented using block mode access and/or file mode access storage protocols. In file mode access, the logical data objects (LOs) are constituted by files, and the network is IP network (e.g. local area network (LAN), wide area network (WAN), and/or a combination thereof, etc.). In block mode access embodiments, the logical data objects are constituted by data blocks, and the network is Storage Area Network (SAN) implementing, for example, Fiber Channel or iSCSI protocols. In certain embodiments the storage device (14a) may be directly connected to a server 12 via block mode access storage protocols (e.g. SCSI, Fiber Channel, etc.). Such Direct Access Storage includes, for example, the internally attached local disk drives or externally attached RAID (redundant array of independent disks) or JBOD (just a bunch of disks), etc.

At least part of the logical data objects may be stored in a transformed form (e.g. a compressed form and/or an encrypted form). Accordingly, they may be transformed (e.g. compressed/decompressed and/or encrypted/decrypted) on a physical and/or logical communication route between the clients/servers and the storage location. The transformation or part thereof may be provided, for example, by the server 12, by the communication device 15, by a transformation system 16 operatively coupled to the clients/servers and the storage device, by the storage device 14, etc. Typically the secure keys used for encryption are held separately from the device providing encryption and/or storage, for example, they may be held at a key holding platform 17 operatively coupled with the transformation platform 16. Likewise, coding tables and similar external data involved in the transformation process may be held separate from the processing and/or storage devices. In certain embodiments of the invention, the transformation system 16 may comprise maintenance unit 18 responsible for various maintenance tasks such as, for example, space optimization.

Note that the invention is not bound by the specific architecture described with reference to FIGS. 1-9. Those versed in the art will readily appreciate that the invention is, likewise, applicable to any computing systems and any storage network architecture facilitating transformation of one or more logical data objects on a physical and/or logical route between a computer sending data access request to the logical data object and a storage location of the appropriate transformed data, including embodiments wherein transformation system is integrated with the communication device, client/server and/or storage device.

Figure 2:
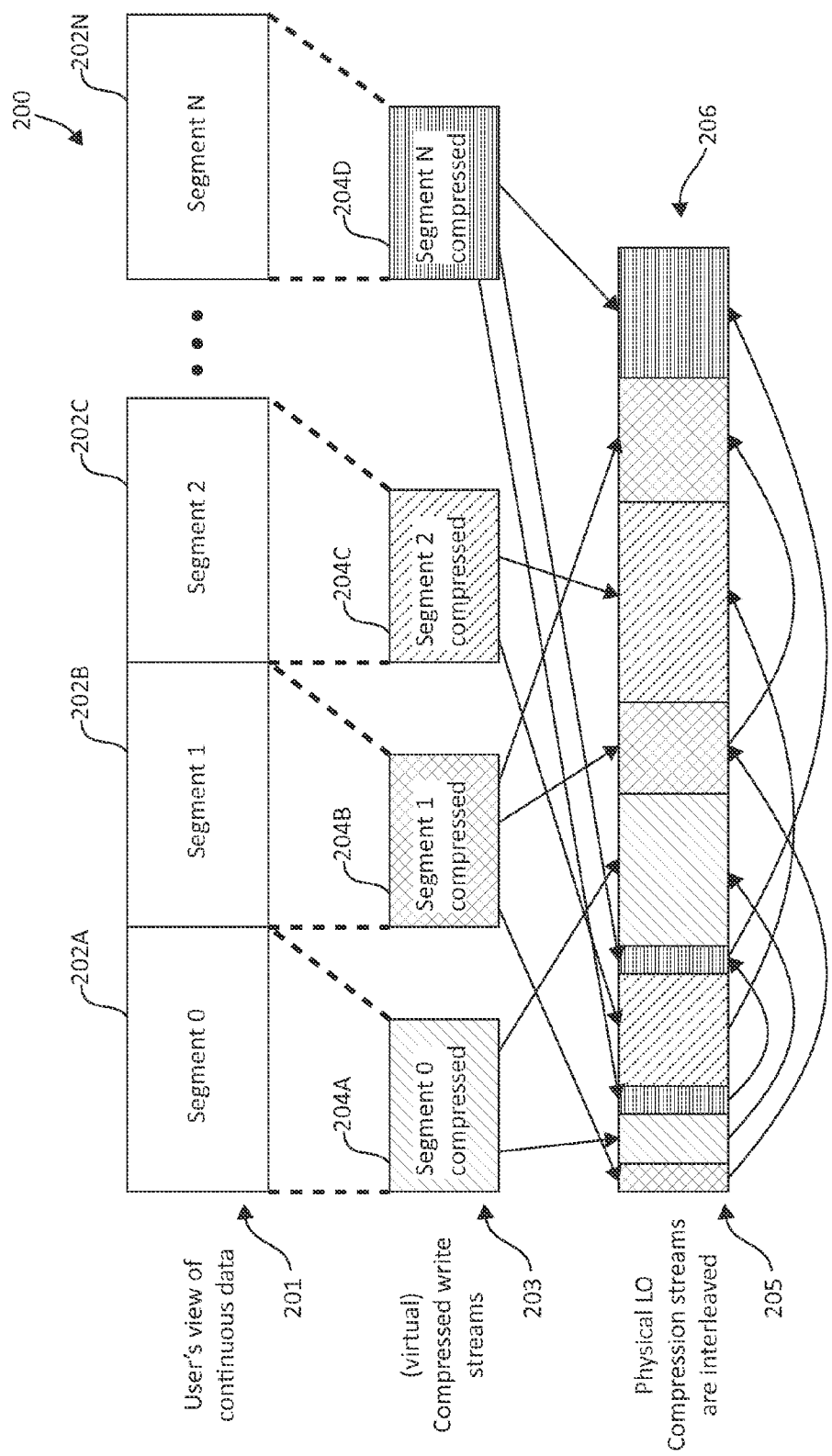
FIG. 2 illustrates a schematic diagram of transformation of logical objects in accordance with certain embodiments of the present invention.

FIG. 2 illustrates a schematic diagram of transformation of logical objects in accordance with certain embodiments of the present invention.

For purpose of illustration only, the following description is provided with respect to compression of logical objects. Those skilled in the art will readily appreciate that the teachings of the present invention are applicable in a similar manner to another transformation of logical objects. There are generally two different approaches to compression of logical objects: position-based and time-based compression. Position-based compression is the classical method of compressing data as a stream beginning at offset 0 of the original LO and ending at the end of the LO (or a certain part thereof). If a client issues non-subsequent write requests, data has to be buffered.

In time-based compression, data is being compressed in the order it is written, i.e. if the client issues write requests to distinct positions in the file, the data is compressed in the same context. The respective compressed data chunks may be accommodated in a log form, journal form or any other form of sequential accommodation. One of the advantages of sequential accommodation (e.g. data journaling) is that subsequent writes to the underlying storage system are mostly adjacent. In many cases, time-based compression yields a higher compression ratio since the context in which the client issues writes often implies that the data parts are related. For example, when managing a database on large files, a single transaction may affect various positions in the database files, but may cause multiple write requests with tightly related data. However, commonly data is structured with relation to content, making the position-based approach viable as it enables unified processing to related data.

In accordance with certain embodiments of the present invention, there is provided a method of compressing a logical object by combining time and position-based approaches, namely continuous segments of LO positions are associated with distinct time-based compression contexts. The method is also applicable to on-the-fly compression of logical objects.

That is, as long as write requests are being issued to offsets in the same pre-defined continuous segments of the user's view of the LO, they are treated as in time-based compression. A user's view of continuous data 201 is illustrated with multiple segments 202 (illustrated in the FIG. 2 as 202A, 202B, 202C, and 202N). Parallel compression contexts are maintained and shown as compressed segment 204 (illustrated in the FIG. 2 as 204A, 204B, 204C, and 204D), one for each segment 202, as shown with the virtual compressed write streams (virtual compression stream) 203. Each virtual compressed stream 203 is an instance of time-based compression, and the separation into segments yields position-based compression.

Restoring the original data can be done in different ways. By way of non-limiting example, different logs of each segment's 202 virtual compression stream 203 may be linked using reference pointers to offsets in the LO as illustrated by arrows in FIG. 2 of the physical LO compression streams 205 that are interleaved. As illustrated in FIG. 2, the compressed LO (target LO) consists of interleaved data of the independent multiple compression streams corresponding to multiple continuous segments. The interleaved virtual compression streams 203 are shown as interleaved virtual compression streams 206 corresponding to multiple continuous segments 204. Alternatively or additionally, the indexing may be provided as detailed with reference to FIGS. 4-7 or otherwise.

Figure 3:
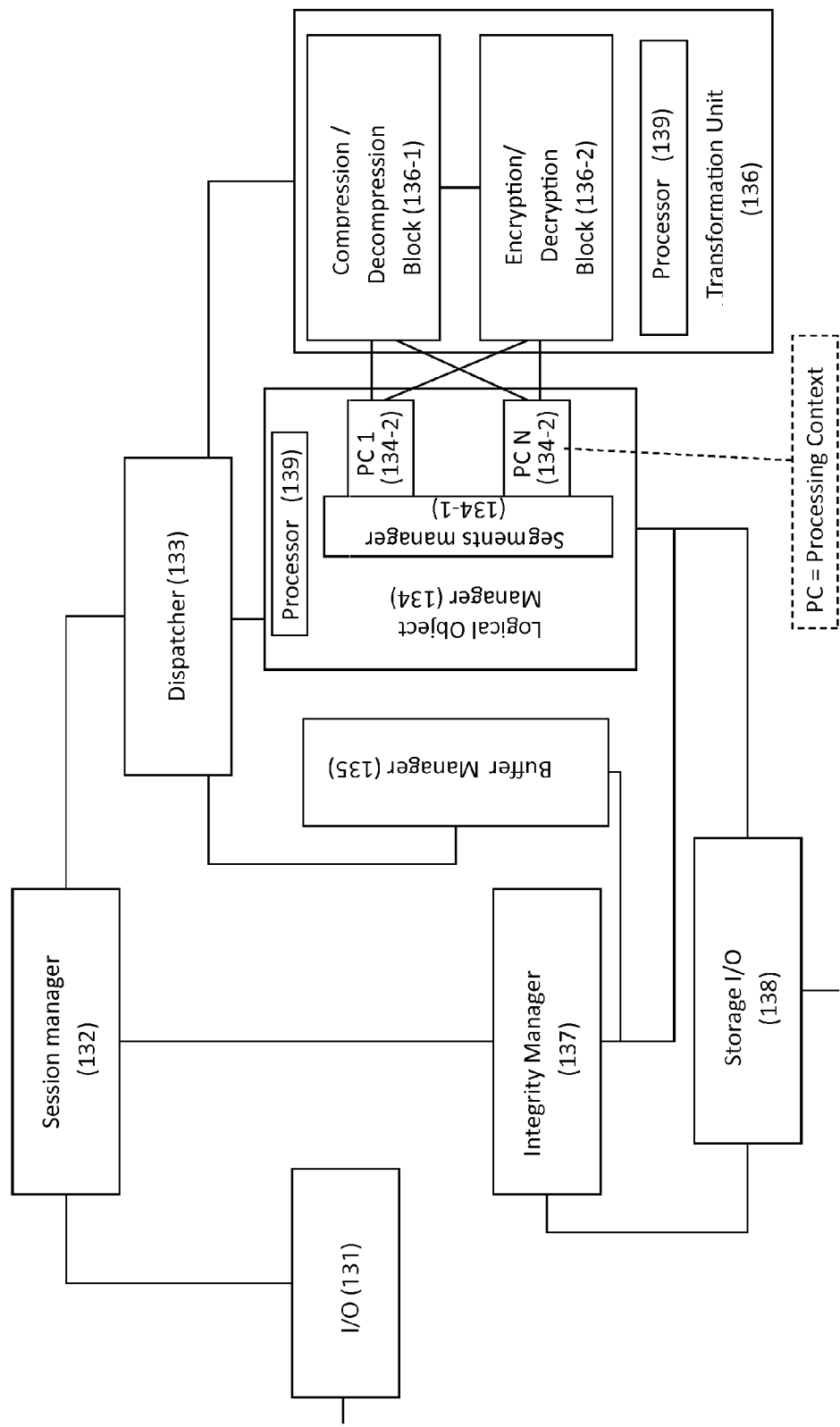
FIG. 3 illustrates a schematic functional block diagram of the transformation system in accordance with certain embodiments of the present invention.

FIG. 3 illustrates a schematic functional block diagram of the transformation system 16 in accordance with certain embodiments of the present invention. The transformation system comprises a Client Input/Output (I/O) block 131 coupled to a session manager 132. The client I/O block gets data access-related requests (e.g. read, write, set end of file/truncate, etc.) from external clients and/or from the maintenance unit 18 and forwards them to the session manager.

A session starts by access request to a logical data object (e.g. LUN capacity request as, for example, SCSI LUN capacity request command; open file request, etc.) and ends by disconnect request (e.g. "LUN disconnect", "close file", etc.) received from the same IP address (user) with regard to the same logical object. The session may handle one or more access requests addressed to the same logical data object (e.g. from multiple applications running on the same client, multiple requests from certain single applications, etc.).

The session manager 132 holds all the session's private data as, for example, source session address, session counters, session status, all instances for the buffers in use, etc. The session manager also handles blocking all the relevant resources when the logical data object is open and releasing said resources on disconnect. The session manager 132 is further configured to manage one or more sessions with access requests addressed to the same logical data object.

The session manager transfers all requests to a dispatcher 133 operatively coupled to the session manager. The dispatcher 133 is operatively coupled to a logical data object manager 134, a buffer manager 135 and a transformation unit 136. The dispatcher 133 communicates with the logical data object manager 134 for data related transactions (e.g. Read, Write, set end of file, etc.) and the transformation unit 136 for transforming operations in accordance with certain embodiments of the present invention.

The transformation unit is capable of compressing, encrypting and/or otherwise transforming data, and sending them to a physical disk through a storage I/O 138; as well as of reading data from the physical disk through the storage I/O, de-transforming (e.g. decrypting and/or decompressing) the respective buffer and, optionally, of segmenting and/or combining original and/or partly transformed data chunks for further processing. The transformation unit may comprise one or more transformation blocks responsible for certain transforming operations (e.g. compression-decompression block 136-1 operatively coupled with the encryption/decryption block 136-2), and is configured to facilitate data transfer and necessary synchronization between said blocks. The transformation unit is also configured to report size of original logical data object (and free storage capacity) in reply to "Capacity status". As one of ordinary skill in the art would appreciate, the transformation unit 136 may include any variety of hardware device components such as a CPU, a controller, or other hardware components for operations and processing of the transformation unit. The processor 139 is one such hardware component to assist in operation of the transformation unit 136.

The transformation unit 136 is also configured to communicate with one or more external platforms storing external information related to data involved in the transformation process (e.g. the secure keys for receiving the keys and/or metadata thereof); to receive said the information, extract or generate the necessary data (e.g. key ID) and to manage thereof. The received information may be temporary accommodated in a trusted memory within the transformation system, wherein the transformation unit block may provide a management of said information (e.g. to manage accommodation of certain keys in said memory for certain time period in accordance with a certain policy). In certain embodiments of the invention the encryption/decryption block 136-2 may further generate one or more encryption initialization vectors to be used for encryption (e.g. together with secure keys).

The logical object manager 134 is responsible for the ordering and memory sharing by different logical data objects and parts thereof. The logical object manager 134 includes segment manager 134-1 holding information of write requests being processed by the logical object manager 134 or the transformation unit 136. The segment manager 134-1 is responsible for facilitating association between write requests received from the client and their corresponding processing contexts 134-2. This association is position-based, while the processing contexts 134-2 maintain a time-based state.

The buffer manager 135 manages memory buffer resources and is responsible for allocating and releasing memory buffer for operations of other blocks. The transformation system further comprises an integrity manager 137 coupled to the session manager, the buffer manager and the data block manager. The integrity manager is responsible for synchronization and general control of all processes in the transformation system as, for example keeping the integrity of the logical data objects, etc. It is also responsible for flashing the memory buffer to the physical disk(s) through the storage physical I/O interface 138, and reading when needed from the disk(s).

Those skilled in the art will readily appreciate that the invention is not bound by the configuration of FIG. 3; equivalent and/or modified functionality may be consolidated or divided in another manner and may be implemented in software, firmware, hardware, or any combination thereof.

Thus, in accordance with certain embodiments of the present invention, the method of transforming logical data object (LO) may comprise dividing a logical data object into one or more segments with sequential data, each segment characterized by respective start and end offsets, processing one or more obtained variable size data chunks corresponding to the transforming logical data object thus giving rise to the processed data chunks, wherein at least one of said processed data chunks comprises transformed data resulting from said processing, associating each obtained data chunk with respective segment of the logical object, sequentially accommodating the processed data chunks in accordance with an order said chunks received while keeping said association with corresponding segments, and facilitating mapping between the data in the logical data object and the processed data chunks.

The logical object may be divided in segments in accordance with predefined and/or dynamically adjustable criterion (e.g. predefined size of segments, predefined number of segments, predefined data format for each segment, etc.).

The processing may comprise one or more techniques of data transformation (e.g. compression, encryption, compression together with encryption, etc.) These techniques are coordinated in time, concurrently execute autonomous sets of instructions, and provided in a manner facilitating preserving the sequence of processing and accommodating the processed data chunks. Optionally, data chunks corresponding to different segments may be transformed in different ways (e.g. if segments correspond to different data formats). The mapping may be provided with the help of at least one index section constituting a part of the transformed logical data object, said index section comprising at least one entry holding at least information related to the processed data chunks, their association with respective segments and indication of physical storage location pertaining to said chunks.

Further, the transforming logical data object (LO) may be provided on-the-fly. Accordingly, in accordance with certain embodiments of the present invention, the method may comprise dividing an incoming data corresponding to a logical data object into one or more independent streams, each stream corresponds to a segment in the logical object comprising sequential data and characterized by respective start and end offsets, processing one or more obtained variable size data chunks corresponding to the transforming logical data object thus giving rise to the processed data chunks, wherein at least one of said processed data chunks comprises transformed data resulting from said processing, associating each obtained data chunk with respective stream, sequentially accommodating the processed data chunks in accordance with an order said chunks received while keeping said association with corresponding streams, and facilitating mapping between the data in the logical data object and the processed data chunks.

FIG. 4-7 illustrate by way of non-limiting example, a maintenance mechanism facilitating mapping between the data in the logical data object and the processed data chunks.

In accordance with certain embodiments of the present invention there is provided a method for organizing and maintaining the processed data chunks associated with different segments of a logical object in a single container (transformed LO) sequentially accommodating the processed data chunks in accordance with an order said chunks received. The method comprises Global Indexing, Semi-Persistent Free Block-Management, and Multi-Stream Bounded Recovery.

Indexing of data enables fast access to the latest log entries corresponding to a particular section. The index resides inside the transformed logical data object (LO) and serves as a map to the data pieces in the journaling stream. Often indexes are themselves implemented with journaling. Since data modifications may be frequent, a fully persistent index may be inefficient to maintain. Therefore, the index is only flushed to the underlying storage periodically. After failure of the logical data objects to be transformed or indexed, the index of data that has not been indexed may be reconstructed (recovered) by processing the part of the stream that was about to be indexed. A global index is a single meta-data stream inside the container, which contains information common to the set of data streams. Such information may be block allocation or de-allocation events, meta-data on the indexes meta-data (e.g. start point of index streams for each data stream).

Semi-Persistent Free-Block Management enables re-using free data blocks among the separate data streams. The list of free blocks is global to the container and constantly changing, thus resides in the global index. However, since block allocations and de-allocations are frequent, a fully persistent free block list may affect performance. By having a semi-persistent global index, we reduce the frequency of global index writes, but the free-block list is not always up-to-date in case a failure has occurred. The global free-block list must be reconstructed after failures, but since there are multiple data streams with semi-persistent data, it is hard to tell which blocks are free. Also, it may be inefficient to load the entire set of stream indexes. Therefore, in accordance with certain embodiments of the present invention, the global free-block list is inferred from the global index and the semi-persistent data. Finding the set of semi-persistent data blocks, called recovery list, is inferred from the order of de-allocation events in the global index.

Bounded data recovery guarantees that the amount of data that has to be processed while reconstructing the stream's index is bounded. Bounded data recovery is achieved by controlling the index flush events, e.g. making them frequent enough. In a case of Multi-Stream Bounded Recovery the amount of data to be processed during recovery, i.e. the size of the recovery list must be controlled. During operation, a Recovery List is presumed and maintained. This list is not used for the recovery process, but maintained only to monitor the future recovery list size in case of failures. When the presumed recovery list is about to be extended beyond the pre-defined recovery bound, an action is taken to shorten it. Such action may be a stream index flush and/or a global index flush. In rare cases where all blocks in the presumed recovery list are in use, at least one of them has to be discontinued in order to make room for a new block in the list.

Figure 4:
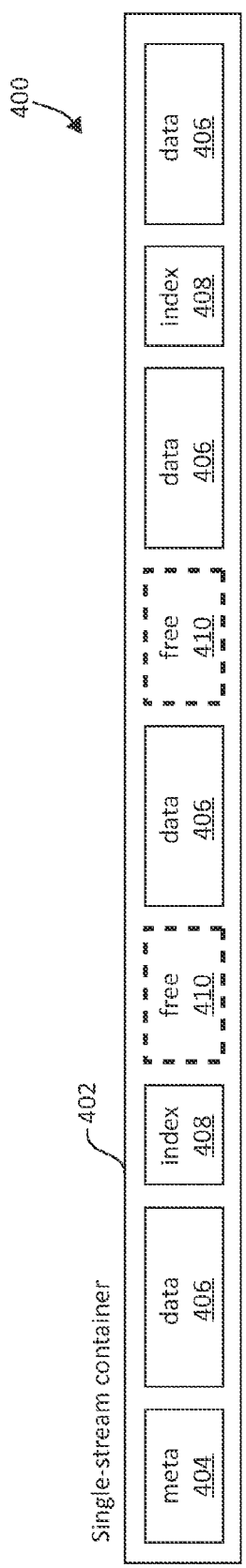
FIG. 4 illustrates a schematic diagram of a single-stream container.

FIG. 4 schematically illustrates a single-stream container 402 with metadata 404, data 406, and index 408. The container may include one or more free blocks 410. The single-stream container is adapted to assist in the organizing and maintaining the processed data chunks associated with different segments of a logical object in a single container (transformed LO) sequentially accommodating the processed data chunks in accordance with an order said chunks received. The various components described within the single-stream container 402 may also assist and be utilized with other components show and described in greater detail in other Figures.

Figure 5:
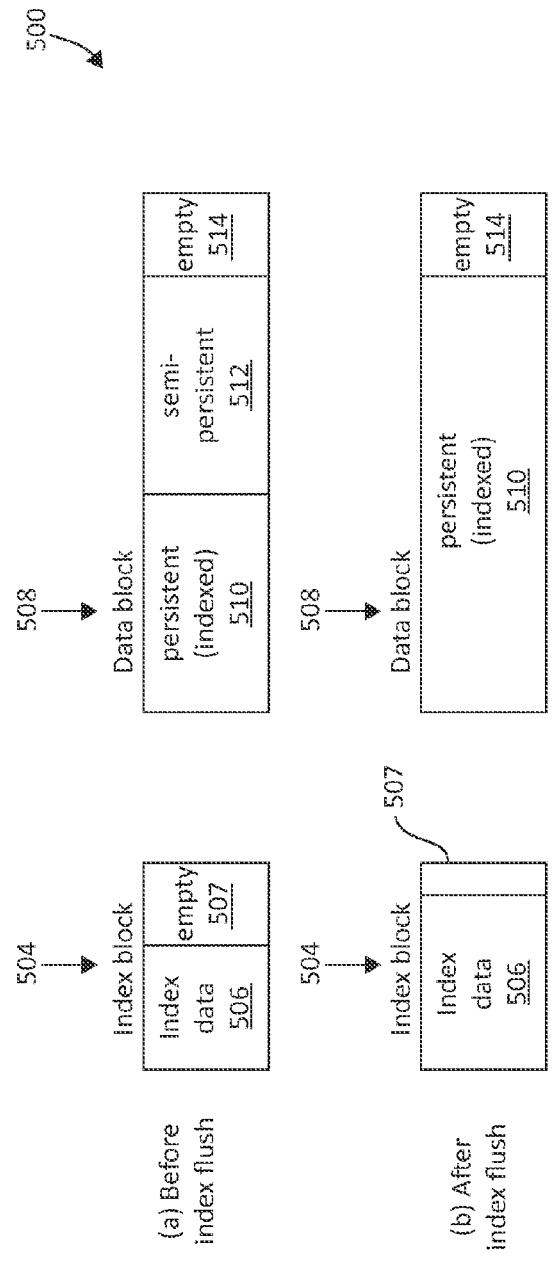
FIG. 5 illustrates a schematic diagram of a data block comprising semi-persistent parts.

In FIG. 5, the term of semi-persistency is schematically illustrated: a data block 508 may contain semi-persistent parts (block) 512, ones that were not written yet to the index block 504. On an index flush event, the semi-persistent parts (block) 512 become persistent. As shown in FIG. 5, prior to an index flush event, an index block 504 with index data 506 and an empty block 507 are shown. The data block 508 is shown containing a persistent (indexed) data block 510, semi-persistent data block 512, and a empty block 514. After an index flush, the index block 504 is illustrated with the index data 506 and the empty block 507. The data block 508 is shown containing a persistent (indexed) block 510 and an empty block 514.

The index block 504 may reside inside a transformed logical data object (LO) and serve as a map to the data pieces in the journaling stream. Often indexes are themselves implemented with journaling, as mentioned above. Since data modifications may be frequent, a fully persistent index 510 may be inefficient to maintain. Therefore, the index block 504 is only flushed to the underlying storage periodically. After failure of the logical data objects to be transformed or indexed, the index block 504 of data that has not been indexed may be reconstructed (recovered) by processing the part of the stream that was about to be indexed.

Figure 6:
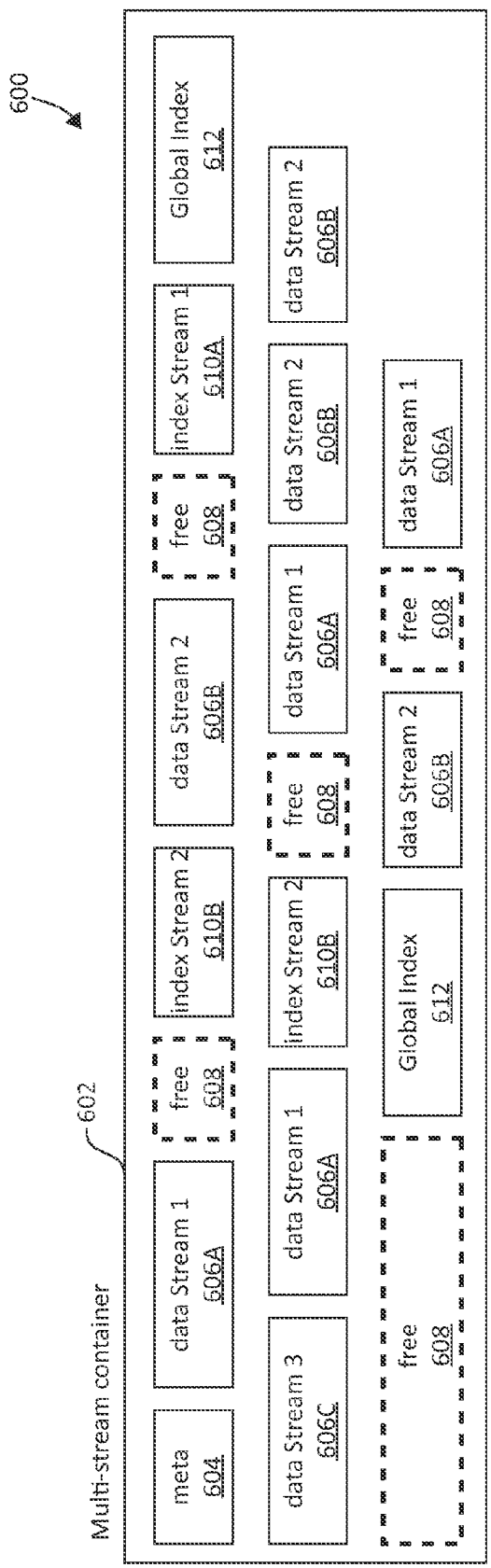
FIG. 6 illustrates a schematic diagram of a multi-stream container in accordance with certain embodiments of the present invention.

FIG. 6 schematically shows a multi-stream container in accordance with certain embodiments of the present invention. It consists of metadata (meta) 604, stream-specific data (data) 606A (shown in FIG. 6 as 606A and 606B), and index steam blocks (index stream) 610 (shown in FIG. 6 as 610A and 610B), global index blocks 612, and global free blocks (free). 608. The list of free blocks and the recovery list may be inferred from the global index 612.

The multi-stream container 602 is also adapted to assist in the organizing and maintaining the processed data chunks associated with different segments of a logical object in a single container (transformed LO) sequentially accommodating the processed data chunks in accordance with an order said chunks received. The various components described within the multi-stream container 602 may also assist and be utilized with other components show and described in greater detail in other Figures.

Figure 7:
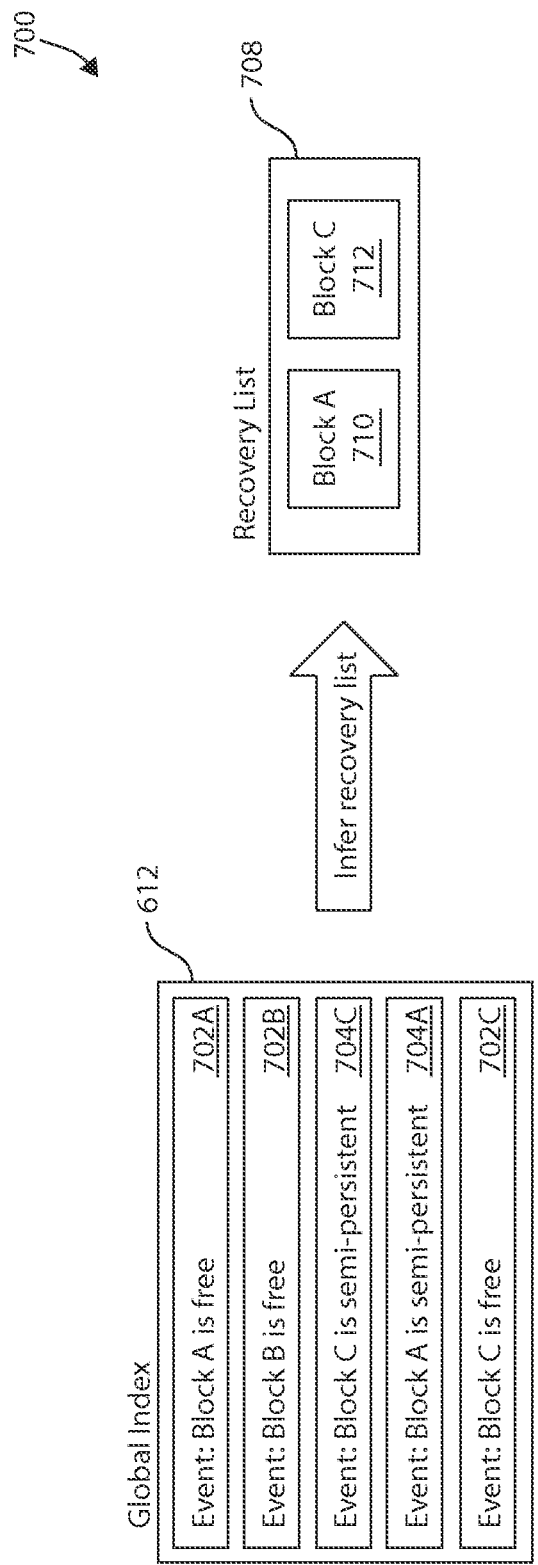
FIG. 7 illustrates a schematic diagram of inferring a recovery list from a list of events in a global index in accordance with certain embodiments of the present invention.

FIG. 7 schematically demonstrates how the recovery list 708 is inferred from the list of events in the global index 612 (FIG. 6). Each block, in the global index 612, that becomes a free block 702 (shown in FIG. 7 as 702A, 702B, and 702C) is appended to the recovery list 708 in block A 710 and/or block C 712, but removed once indexed as a semi-persistent data block 704 (shown in FIG. 7 as 704A and 704C), i.e. no need to recover its index data. The blocks 702 and 704 within the global index 612 may be a free block 702 and/or may be a semi-persistent data block 704.

By the use of Semi-Persistent Free-Block Management protocol, such management enables re-using free data blocks 702 among the separate data streams 606 (shown in FIG. 6 as 606A, 606B, and 606C). The list of free blocks 410 and 608 (as shown in FIG. 4 and FIG. 6) is global to the single and/or multi-stream container 402 and 602 (as shown FIG. 4 and FIG. 6) and constantly changing and may reside in the global index 612 as free data blocks 702. However, since block allocations and de-allocations are frequent, a fully persistent free block 510 (FIG. 5) list may affect performance. By having a semi-persistent global index, we reduce the frequency of global index writes, but the free-block list is not always up-to-date in case a failure has occurred. The global free-block list must be reconstructed after failures, but since there are multiple data streams with semi-persistent data, it is hard to tell which blocks 702 or 704 are free. Also, it may be inefficient to load the entire set of stream indexes. Therefore, in accordance with certain embodiments of the present invention, the global free-block list is inferred from the global index 612 and the semi-persistent data blocks 704, identified in the global index 612. Finding the set of semi-persistent data blocks 710 and 712, called the recovery list 708, is inferred from the order of de-allocation events in the global index 612.

In addition, the bounded data recovery guarantees that the amount of data that has to be processed while reconstructing the stream's index is bounded. In a case of multi-stream bounded recovery the amount of data to be processed during recovery, i.e. the size of the recovery list 708 must be controlled. During operation, the recovery list 708 is presumed and maintained. This recovery list 708 is not used for the recovery process, but maintained only to monitor the future recovery list size in case of failures. When the recovery list 708 is about to be extended beyond the pre-defined recovery bound, an action is taken to shorten it. Such action may be a stream index flush and/or a global index flush. In rare cases where all blocks 710 and 712 in the recovery list are in use, at least one of them has to be discontinued in order to make room for a new block (not shown but additional blocks may be added to the list as needed) in the list.

Figure 8:
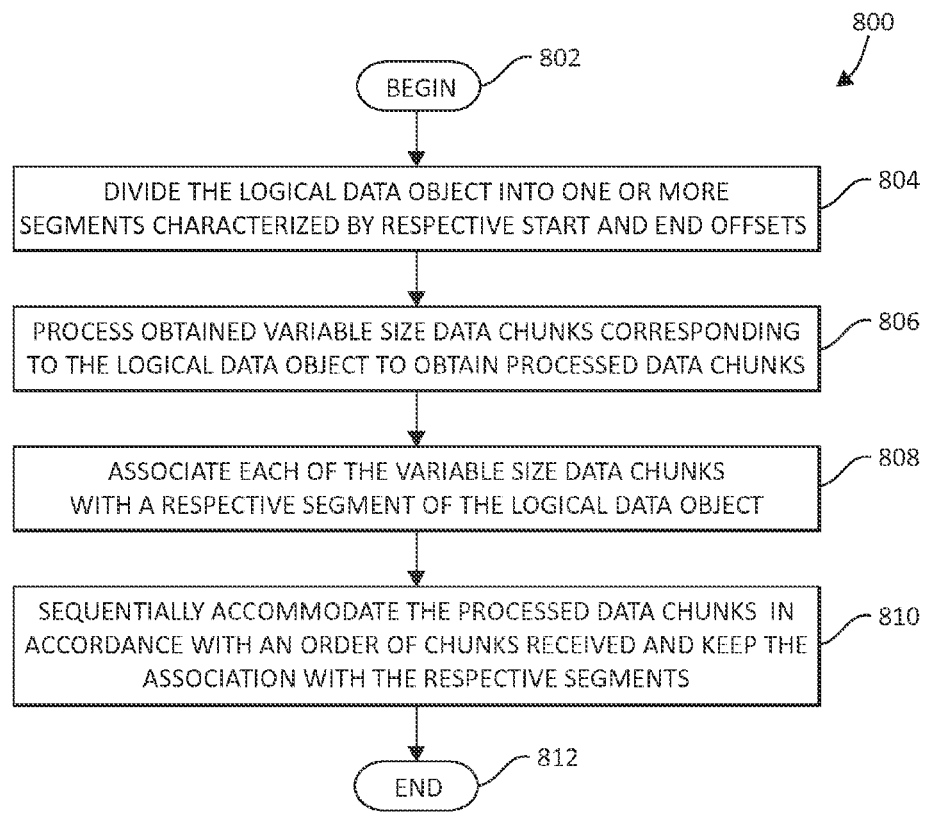
FIG. 8 illustrates a flow chart diagram of an exemplary method of transforming a logical data object for storage.

FIG. 8 illustrates a flow chart diagram 800 of an exemplary method of transforming a logical data object for storage in a storage device operable with at least one storage protocol. The method 800 begins (step 802) with dividing the logical data object into one or more segments, each segment characterized by respective start and end offsets (step 804). Next, the method 800 includes processing one or more obtained variable size data chunks corresponding to the logical data object to obtain processed data chunks, wherein at least one of the processed data chunks comprises transformed data resulting from the processing (step 806). Each of the variable size data chunks is associated with a respective segment of the logical data object (step 808). Finally, the method 800 sequentially accommodates the processed data chunks in accordance with an order of chunks received while keeping the association with the respective segments (step 810). The method 800 ends (step 812).

Figure 9:
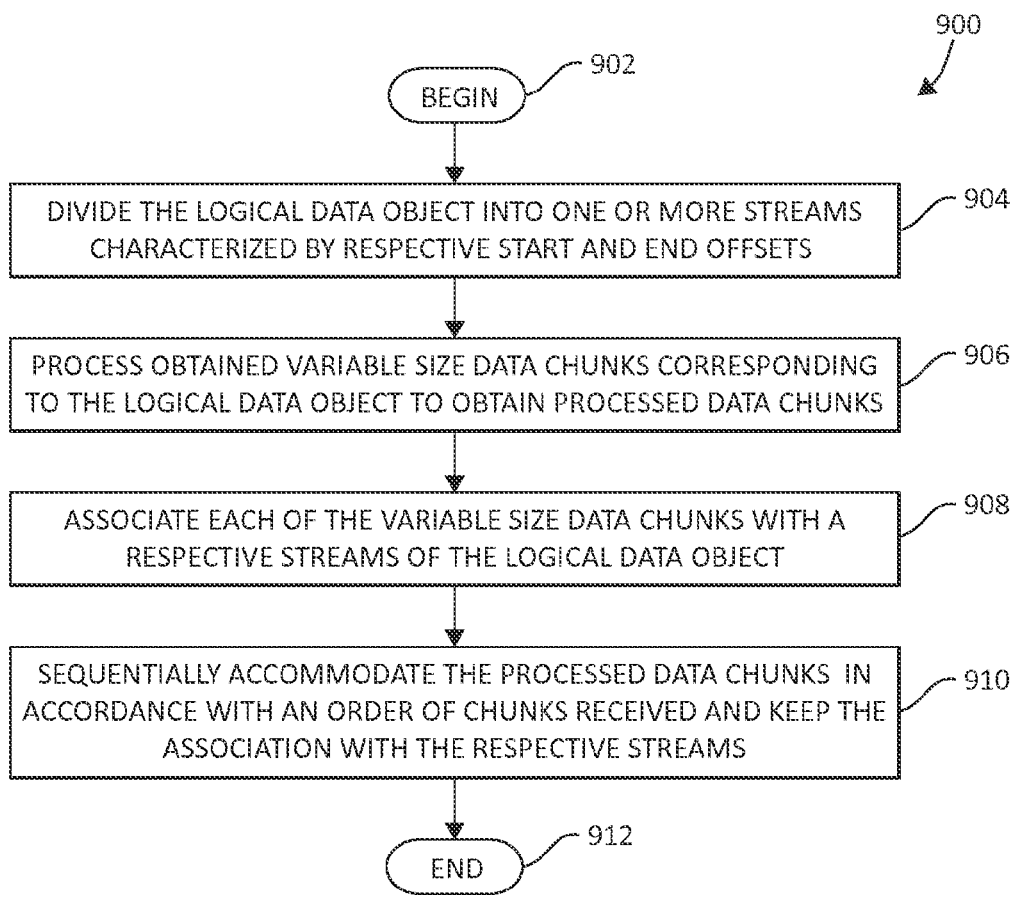
FIG. 9 illustrates a flow chart diagram of an exemplary method of on-the-fly transformation of a logical data object for storage in a storage device operable with at least one storage protocol.

FIG. 9 illustrates a flow chart diagram 900 of an exemplary method of on-the-fly transformation of a logical data object for storage in a storage device operable with at least one storage protocol. The method 900 begins (step 902) with dividing the logical data object into one or more streams, each segment characterized by respective start and end offsets (step 904). Next, the method 900 includes processing one or more obtained variable size data chunks corresponding to the logical data object to obtain processed data chunks, wherein at least one of the processed data chunks comprises transformed data resulting from the processing (step 906). Each of the variable size data chunks is associated with a respective stream of the logical data object (step 908). Finally, the method 900 sequentially accommodates the processed data chunks in accordance with an order of chunks received while keeping the association with the respective streams (step 910). The method 900 ends (step 912).

Certain embodiments of above method of transforming a logical data object for storage in a storage device operable with at least one storage protocol is detailed in International Applications WO2007138600, WO2007138601 and WO2007138602 published Dec. 12, 2007 and assigned to the assignee of the present application. The transformed data chunks may be accommodated in a log form, journal form or any other form of sequential accommodation.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method of transforming a logical data object for storage in a storage device operable with at least one storage protocol, said method comprising:
   dividing the logical data object into a plurality of segments, each segment characterized by respective start and end offsets, wherein the storage device is one of a network-attached storage (NAS) file server, a storage area network (SAN) storage device, and a stream storage device;
   receiving a first plurality of variable size data chunks at a first time and corresponding to the logical data object;
   processing the first plurality of variable size data chunks to generate a first plurality of processed data chunks;
   receiving a second plurality of variable size data chunks at a second time and corresponding to the logical data object;
   processing the second plurality of variable size data chunks to generate a second plurality of processed data chunks, wherein:
      processing the first and second plurality of variable size data chunks comprises compressing the first and second plurality of variable size data chunks by combining a time-based compression technique and a position-based compression technique,
      the time-based compression technique comprises compressing the first plurality of variable size data chunks to form a first compressed stream and compressing the second plurality of variable size data chunks to form a second compressed stream, and
      the position-based compression technique comprises dividing at least one data chunk in the first compressed stream into at least two portions including different sizes, dividing at least one data chunk in the second compressed stream into at least two portions including different sizes, and interleaving the divided portions from the first compressed stream and the second compressed stream, wherein interleaving the portions comprises interleaving at least two portions of text data;
   repeating the processing technique for each subsequently received plurality of variable size data chunks;
   bounding the amount of processed data by controlling a size of a recovery list and a flushing frequency of a segment index section, a global index section, or both for data recovery;
   associating each processed data chunk with a respective segment of the logical data object; and
   sequentially accommodating each plurality of processed data chunks in accordance with an order in which each plurality of variable size data chunks were received while maintaining each association with the respective segments.

2. The method of claim 1, further including facilitating mapping between data in the logical data object and the processed data chunks.

3. The method of claim 2, wherein the segment index section, the global index section, or both are configured for assisting with facilitating the mapping between the data in the logical data object and the plurality of processed data chunks.

4. The method of claim 1, further including performing at least one of:
   mapping at least one data piece in a journaling stream,
   flushing periodically at least one index section to at least one associated storage device, and
   recovering a portion of the at least one index section that has not been indexed by processing a data stream queued for indexing.

5. The method of claim 1, further including configuring a semi-persistent global index for reusing free data blocks associated among a plurality of logical data objects.

6. A method of on-the-fly transformation of a logical data object for storage in a storage device operable with at least one storage protocol, said method comprising:
   dividing the logical data object into a plurality of streams, each stream characterized by respective start and end offsets, wherein the storage device is one of a network-attached storage (NAS) file server, a storage area network (SAN) storage device, and a stream storage device;
   receiving a first plurality of variable size data chunks at a first time and corresponding to the logical data object;
   processing the first plurality of variable size data chunks to generate a first plurality of processed data chunks;

receiving a second plurality of variable size data chunks corresponding to the logical data object;

processing the second plurality of variable size data chunks to generate a second plurality of processed data chunks, wherein:

processing the first and second plurality of variable size data chunks comprises compressing the first and second plurality of variable size data chunks by combining a time-based compression technique and a position-based compression technique, the time-based compression technique comprises compressing the first plurality of variable size data chunks to form a first compressed stream and compressing the second plurality of variable size data chunks to form a second compressed stream, and the position-based compression technique comprises dividing at least one data chunk in the first compressed stream into at least two portions including different sizes, dividing at least one data chunk in the second compressed stream into at least two portions including different sizes, and interleaving the divided portions from the first compressed stream and the second compressed stream, wherein interleaving the portions comprises interleaving at least two portions of text data;

repeating the processing technique for each subsequently received plurality of variable size data chunks;

bounding the amount of processed data by controlling a size of a recovery list and a flushing frequency of a segment index section, a global index section, or both for data recovery;

associating each processed data chunk with a respective stream of the logical data object; and sequentially accommodating each plurality of processed data chunks in accordance with an order in which each plurality of variable size data chunks were received while maintaining each association with the respective streams.

7. The method of claim 6, further including facilitating mapping between data in the logical data object and the processed data chunks.

8. The method of claim 7, wherein the segment index section, the global index section, or both are configured for assisting with facilitating the mapping between the data in the logical data object and the plurality of processed data chunks.

9. The method of claim 6, further including performing at least one of:

mapping at least one data piece in a journaling stream, flushing periodically at least one index section to at least one associated storage device, and recovering a portion of the at least one index section that has not been indexed by processing a data stream queued for indexing.

10. The method of claim 6, further including configuring a semi-persistent global index for reusing free data blocks associated among a plurality of logical data objects.

11. A system for transforming a logical data object for storage in a storage device operable with at least one storage protocol, comprising:

a processor device, operable in the storage device, wherein the processor device is adapted for:

dividing the logical data object into a plurality of segments, each segment characterized by respective start and end offsets, wherein the storage device is one of a network-attached storage (NAS) file server, a storage area network (SAN) storage device, and a stream storage device;

receiving a first plurality of variable size data chunks at a first time and corresponding to the logical data object;

processing the first plurality of variable size data chunks to generate a first plurality of processed data chunks;

receiving a second plurality of variable size data chunks corresponding to the logical data object;

processing the second plurality of variable size data chunks to generate a second plurality of processed data chunks, wherein:

processing the first and second plurality of variable size data chunks comprises compressing the first and second plurality of variable size data chunks by combining a time-based compression technique and a position-based compression technique, the time-based compression technique comprises compressing the first plurality of variable size data chunks to form a first compressed stream and compressing the second plurality of variable size data chunks to form a second compressed stream, and the position-based compression technique comprises dividing at least one data chunk in the first compressed stream into at least two portions including different sizes, dividing at least one data chunk in the second compressed stream into at least two portions including different sizes, and interleaving the divided portions from the first compressed stream and the second compressed stream, wherein interleaving the portions comprises interleaving at least two portions of text data;

repeating the processing technique for each subsequently received plurality of variable size data chunks;

bounding the amount of processed data by controlling a size of a recovery list and a flushing frequency of a segment index section, a global index section, or both for data recovery;

associating each processed data chunk with a respective segment of the logical data object; and sequentially accommodating each plurality of processed data chunks in accordance with an order in which each plurality of variable size data chunks were received while maintaining each association with the respective segments.

12. The system of claim 11, wherein the processor device is further adapted for facilitating mapping between the data in the logical data object and the processed data chunks.

13. The system of claim 12, wherein the segment index section, the global index section, or both are configured for assisting with facilitating the mapping between the data in the logical data object and the plurality of processed data chunks.

14. The system of claim 11, wherein the processor device is further adapted for performing at least one of:

mapping at least one data piece in a journaling stream, flushing periodically at least one index section to at least one associated storage device, and recovering a portion of the at least one index section that has not been indexed by processing a data stream queued for indexing.

15. The system of claim 11, wherein the processor device is further adapted for configuring a semi-persistent global index for reusing free data blocks associated among a plurality of the logical data objects.

16. A system of on-the-fly transformation of a logical data object for storage in a storage device operable with at least one storage protocol, comprising:

a processor device, operable in the storage device, wherein the processor device is adapted for:

dividing the logical data object into a plurality of streams, each stream characterized by respective start and end offsets, wherein the storage device is one of a network-attached storage (NAS) file server, a storage area network (SAN) storage device, and a stream storage device;

receiving a first plurality of variable size data chunks at a first time and corresponding to the logical data object;

processing the first plurality of variable size data chunks to generate a first plurality of processed data chunks;

receiving a second plurality of variable size data chunks corresponding to the logical data object;

processing the second plurality of variable size data chunks to generate a second plurality of processed data chunks, wherein:

processing the first and second plurality of variable size data chunks comprises compressing the first and second plurality of variable size data chunks by combining a time-based compression technique and a position-based compression technique, the time-based compression technique comprises compressing the first plurality of variable size data chunks to form a first compressed stream and compressing the second plurality of variable size data chunks to form a second compressed stream, and the position-based compression technique comprises dividing at least one data chunk in the first compressed stream into at least two portions including different sizes, dividing at least one data chunk in the second compressed stream into at least two portions including different sizes, and interleaving the portions including the different sizes from each divided and compressed variable size data chunk, wherein interleaving the at least two portions comprises interleaving at least two portions of text data;

repeating the processing technique for each subsequently received plurality of variable size data chunks;

bounding the amount of processed data by controlling a size of a recovery list and a flushing frequency of a segment index section, a global index section, or both for data recovery;

associating each processed data chunk with a respective stream of the logical data object; and sequentially accommodating each plurality of processed data chunks in accordance with an order in which each plurality of variable size data chunks were received while maintaining each association with the respective streams.

17. The system of claim 16, wherein the processor device is further adapted for facilitating mapping between the data in the logical data object and the processed data chunks.

18. The system of claim 17, wherein the segment index section, the global index section, or both are configured for assisting with facilitating the mapping between the data in the logical data object and the plurality of processed data chunks.

19. The system of claim 16, wherein the processor device is further adapted for performing at least one of:

mapping at least one data piece in a journaling stream, flushing periodically at least one index section to at least one associated storage device, and recovering a portion of the at least one index section that has not been indexed by processing a data stream queued for indexing.

20. The system of claim 16, wherein the processor device is further adapted for configuring a semi-persistent global index for reusing free data blocks associated among a plurality of logical data objects.

21. A computer program product for transforming a logical data object for storage in a storage device operable with at least one storage protocol, the computer program product comprising a non transitory computer-readable storage medium having computer-readable program code portions stored therein, the computer-readable program code portions comprising:

a first executable portion for dividing the logical data object into a plurality of segments, each segment characterized by respective start and end offsets, wherein the storage device is one of a network-attached storage (NAS) file server, a storage area network (SAN) storage device, and a stream storage device;

a second executable portion for receiving a first and a second plurality of variable size data chunks corresponding to the logical data object;

a third executable portion for processing the first and the second plurality of variable size data chunks to generate a first and a second plurality of processed data chunks, wherein:

processing the first and the second plurality of variable size data chunks comprises compressing the first and the second plurality of variable size data chunks by combining a time-based compression technique and a position-based compression technique, the time-based compression technique comprises compressing the first plurality of variable size data chunks to form a first compressed stream and compressing the second plurality of variable size data chunks to form a second compressed stream, the position-based compression technique comprises dividing at least one data chunk in the first compressed stream into at least two portions including different sizes, dividing at least one data chunk in the second compressed stream into at least two portions including different sizes, and interleaving the portions including the different sizes from each divided and compressed variable size data chunk, wherein interleaving the at least two portions comprises interleaving at least two portions of text data, and the processing technique is repeated for each subsequently received plurality of variable size data chunks;

a fourth executable portion for bounding the amount of processed data by controlling a size of a recovery list and a flushing frequency of a segment index section, a global index section, or both for data recovery;

a fifth executable portion for associating each processed data chunk with a respective segment of the logical data object; and a sixth executable portion for sequentially accommodating each plurality of processed data chunks in accordance with an order in which each plurality of variable size data chunks are received while maintaining each association with the respective segments.

22. The computer program product of claim 21, further including a seventh executable portion for facilitating mapping between data in the logical data object and the processed data chunks.

23. The computer program product of claim 22, wherein the segment index section, the global index section, or both are configured for assisting with facilitating the mapping between the data in the logical data object and the plurality of processed data chunks.

24. The computer program product of claim 21, further including a seventh executable portion for performing at least one of:
mapping at least one data piece in a journaling stream,
flushing periodically at least one index section to at least one associated storage device, and
recovering a portion of the at least one index section that has not been indexed by processing a data stream queued for indexing.

25. The computer program product of claim 21, further including a seventh executable portion for configuring a semi-persistent global index for reusing free data blocks associated among a plurality of the logical data objects.

26. A computer program product on-the-fly transformation of a logical data object for storage in a storage device operable with at least one storage protocol, the computer program product comprising a non transitory computer-readable storage medium having computer-readable program code portions stored therein, the computer-readable program code portions comprising:
a first executable portion for dividing the logical data object into a plurality of streams, each stream characterized by respective start and end offsets, wherein the storage device is one of a network-attached storage (NAS) file server, a storage area network (SAN) storage device, and a stream storage device;
a second executable portion for receiving a first and a second plurality of variable size data chunks corresponding to the logical data object;
a third executable portion for processing the first and the second plurality of variable size data chunks to generate a first and a second plurality of processed data chunks, wherein:
processing the first and the second plurality of variable size data chunks comprises compressing the first and the second plurality of variable size data chunks by combining a time-based compression technique and a position-based compression technique,
the time-based compression technique comprises compressing the first plurality of variable size data chunks to form a first compressed stream and compressing the second plurality of variable size data chunks to form a second compressed stream,
the position-based compression technique comprises dividing at least one data chunk in the first compressed stream into at least two portions including different sizes, dividing at least one data chunk in the second compressed stream into at least two portions including different sizes, and interleaving the divided portions from the first compressed stream and the second compressed stream, wherein interleaving the at least two portions comprises interleaving at least two portions of text data, and
the processing technique is repeated for each subsequently received plurality of variable size data chunks;
a fourth executable portion for bounding the amount of processed data by controlling a size of a recovery list and a flushing frequency of a segment index section, a global index section, or both for data recovery;
a fifth executable portion for associating each processed data chunk with a respective stream of the logical data object; and
a sixth executable portion for sequentially accommodating each plurality of processed data chunks in accordance with an order in which each plurality of variable size data chunks were received while maintaining each association with the respective streams.

27. The computer program product of claim 26, further including a seventh executable portion for facilitating mapping between data in the logical data object and the processed data chunks.

28. The computer program product of claim 27, wherein the segment index section, the global index section, or both are configured for assisting with facilitating the mapping between the data in the logical data object and the plurality of processed data chunks.

29. The computer program product of claim 26, further including a seventh executable portion for performing at least one of:
mapping at least one data piece in a journaling stream,
flushing periodically at least one index section to at least one associated storage device, and
recovering a portion of the at least one index section that has not been indexed by processing a data stream queued for indexing.

30. The computer program product of claim 26, further including a seventh executable portion for configuring a semi-persistent global index for reusing free data blocks associated among a plurality of the logical data objects.

* * * * *